United States Patent [19]

Schnaibel et al.

[11] Patent Number: 5,769,054
[45] Date of Patent: Jun. 23, 1998

[54] METHOD AND ARRANGEMENT FOR CONTROLLING THE TORQUE OF INTERNAL COMBUSTION ENGINE WHILE DEACTIVATING INDIVIDUAL CYLINDERS

[75] Inventors: Eberhard Schnaibel, Hemmingen; Hong Zhang, Regensburg, both of Germany

[73] Assignee: Robert Bosch GmbH, Stuttgart, Germany

[21] Appl. No.: 607,131

[22] Filed: Feb. 26, 1996

Related U.S. Application Data

[63] Continuation-in-part of Ser. No. 318,263, Oct. 5, 1994, abandoned.

[30] Foreign Application Priority Data

Oct. 13, 1993 [DE] Germany .......................... 43 34 864.5

[51] Int. Cl.[6] ........................................................ F02P 5/00
[52] U.S. Cl. ............................................................ 123/417
[58] Field of Search ........................ 123/417; 364/426.03, 364/426.02; 180/197

[56] References Cited

U.S. PATENT DOCUMENTS

| | | | |
|---|---|---|---|
| 5,213,178 | 5/1993 | Polidan et al. ........................... | 123/417 |
| 5,291,965 | 3/1994 | Takata ...................................... | 180/197 |
| 5,297,662 | 3/1994 | Tsuyama et al. ........................ | 180/197 |
| 5,329,453 | 7/1994 | Tsuyama et al. .................. | 364/426.02 |
| 5,341,298 | 8/1994 | Singleton et al. ................. | 364/426.02 |
| 5,358,084 | 10/1994 | Schramm ................................ | 180/197 |
| 5,369,586 | 11/1994 | Bridgens ............................ | 364/426.03 |
| 5,402,345 | 3/1995 | Kost .................................... | 364/426.02 |
| 5,407,023 | 4/1995 | Yamashita et al. ..................... | 180/197 |

OTHER PUBLICATIONS

"Traction Control (ASR) Using Fuel Injection Suppression", SAE–Technical Paper Series 920,641, (1992), pp. 35 to 42.

"Zylinderabschaltung und Ausblenden einzelner Arbeitszyklen zur Kraftstoffersparnis und Schadstoffminderung", MTZ, Motortechnische Zeitschrift 54, (1993), pp. 240 to 246.

*Primary Examiner*—Raymond A. Nelli
*Attorney, Agent, or Firm*—Walter Ottesen

[57] ABSTRACT

The invention is directed to a method and an arrangement for controlling the torque outputted by an internal combustion engine while deactivating individual cylinders. A desired value for the torque outputted is obtained by suppressing and resuming the metering of fuel to at least one cylinder as well as by adjusting the ignition angle. The deactivation and reactivation of the cylinders and the adjustment of the ignition angle are synchronized.

10 Claims, 7 Drawing Sheets

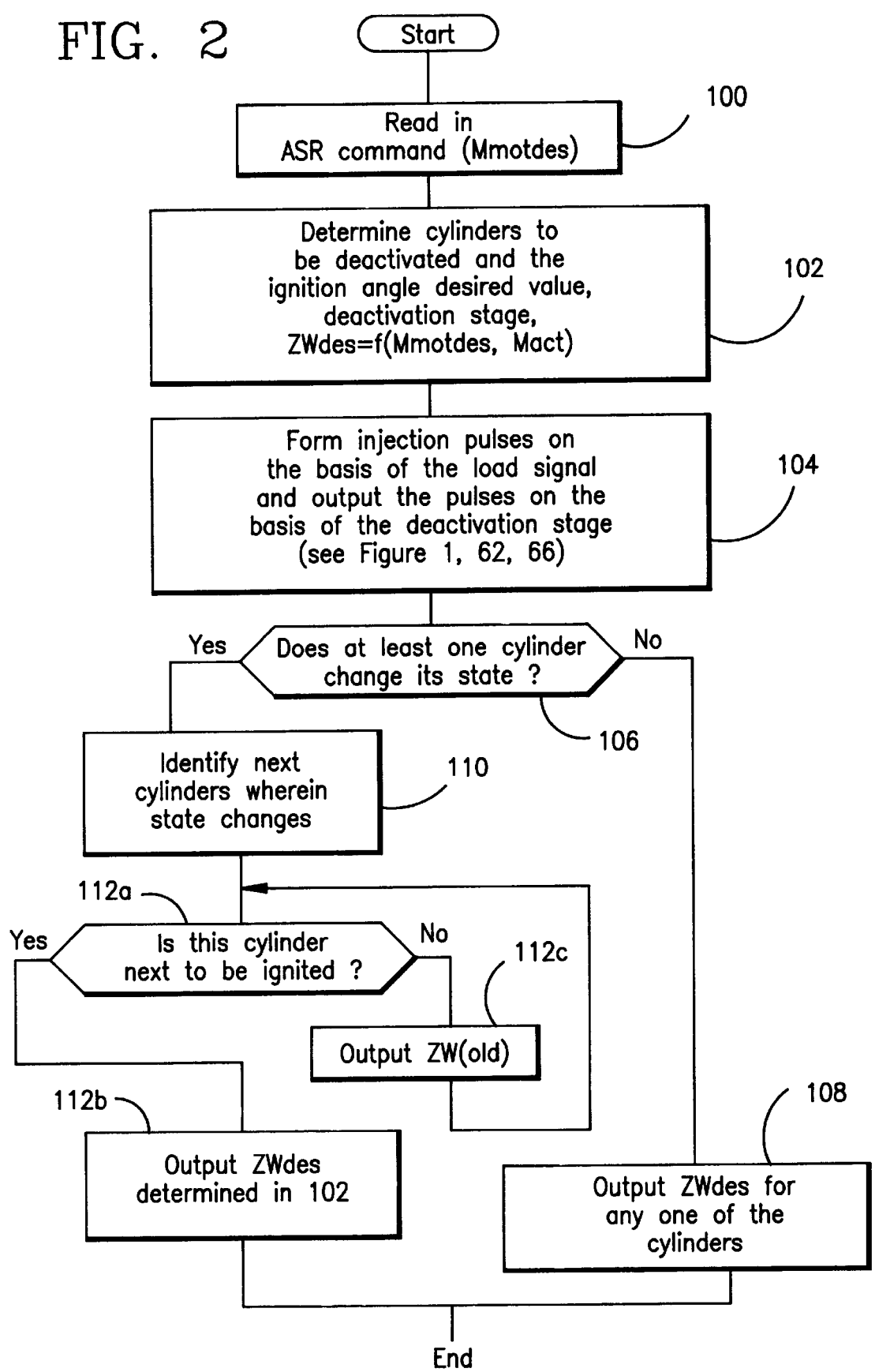

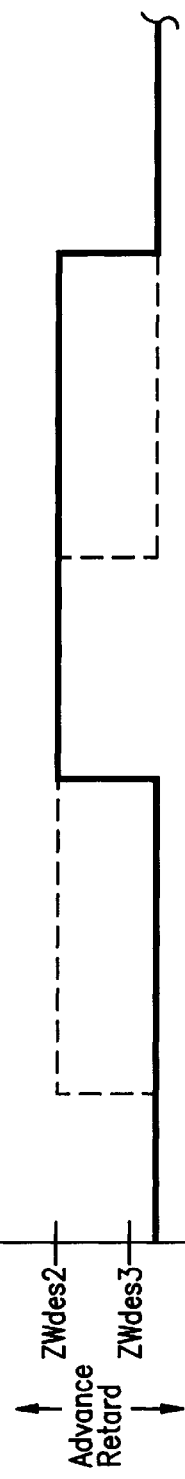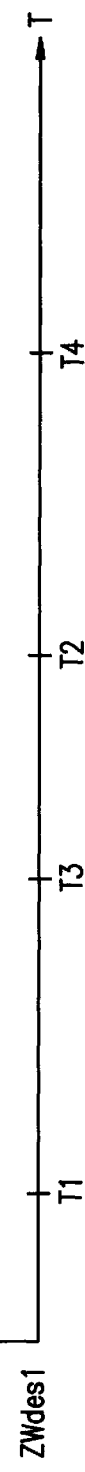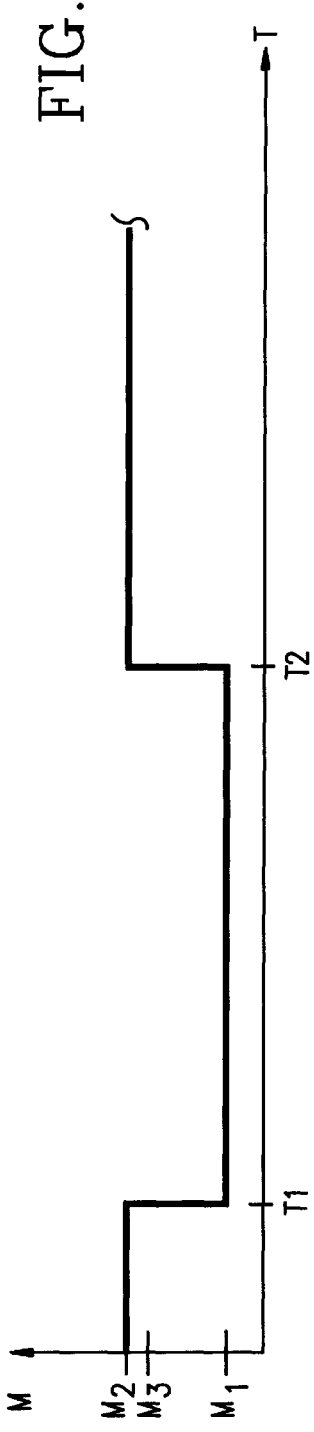

METHOD AND ARRANGEMENT FOR CONTROLLING THE TORQUE OF INTERNAL COMBUSTION ENGINE WHILE DEACTIVATING INDIVIDUAL CYLINDERS

RELATED APPLICATION

This application is a continuation-in-part application of patent application Ser. No. 08/318,263, filed Oct. 5, 1994, abandoned and entitled "Method and Arrangement for Controlling an Internal Combustion Engine".

BACKGROUND OF THE INVENTION

A method and an arrangement for controlling an internal combustion engine is disclosed in the article of B. Böning et al entitled "Traction Control (ASR) Using Fuel Injection Suppression—A Cost Effective Method of Engine-Torque Control", SAE Technical Paper Series, Paper Number 920, 641, pages 35 to 42. In this method and arrangement, individual injection pulses for controlling the slippage to a predetermined value are suppressed or are again supplied in accordance with a command for changing power as a consequence of slippage occurring at the drive wheels of the motor vehicle. The actual slippage at the drive wheels is determined on the basis of the rotational velocities of the driven wheels and the non-driven wheels. When this slippage exceeds a pregiven threshold, a correction signal is emitted to the control apparatus for the engine power for controlling the torque supplied by the engine in the sense of a control of the slippage to the desired value. In the known system, this correction signal leads to the selection of a torque reducing stage which determines the number of the cylinders to be deactivated in accordance with a pregiven table. An increase of the number of the cylinders to be deactivated for a corresponding change of the correction signal leads to a reduction of the actual torque outputted by the engine; whereas, for a change of the correction signal in the opposite direction when individual cylinders are again switched on, an increase of the actual torque outputted results. In addition to the suppression of the injection pulses, an influencing of the ignition angle in the direction of retardation is suggested for the known system. A suitable procedure for influencing the ignition angle, especially in combination with the suppression of fuel injection pulses, is not described.

SUMMARY OF THE INVENTION

In view of the above, it is an object of the invention to provide measures for influencing the ignition angle for systems wherein injection pulses to one or more cylinders are suppressed and are again resumed as required for controlling the torque to be outputted.

Suppressing or resuming individual injection pulses is not only known in combination with a drive slip control. Injection-pulse suppression is also used, for example, in dependence upon the load input by the driver for controlling power of the engine, for saving fuel and for reducing toxic substances. In this connection, reference can be made to the article of R. van Basshuysen entitled "Zylinderabschaltung und Ausblenden einzelner Arbeitszyklen zur Kraftstoffersparnis und Schadstoffminderung", MTZ Motortechnische Zeitschrift, Volume 54, (1993), pages 240 to 246. In addition, the suppression of individual injection pulses is utilized for limiting engine rpm or for providing a comfortable transition into overrun operation or from overrun operation into the fired engine operation.

U.S. Pat. No. 5,558,178 discloses that, on the basis of the load signal (quotient of air throughput and rpm), the engine rpm, and the number of the actually deactivated cylinders, the torque emitted by the engine can be estimated and the number of cylinders to be deactivated and the desired ignition angle to be adjusted for realizing the pregiven torque can be determined by a comparison with the torque command of the ASR system.

The operational performance of the internal combustion engine with respect to injection suppression or resumption of the suppressed injection pulses is significantly improved with the procedure provided by the invention.

It is especially advantageous that an essentially continuous course of the engine torque is made possible by intervening on the ignition angle simultaneously with injection suppression.

It is especially advantageous that ignition angle intervention and the suppression of injection are synchronized with respect to each other; that is, a change of the ignition angle takes place at the earliest when the cylinder to be deactivated or reactivated is ready for ignition.

The course of the engine torque with a change of the number of deactivated cylinders exhibits no or only a small jump which, furthermore, takes place in the same direction as that pregiven by the change.

With the procedure of the invention, overshoots and undershoots of the engine torque during changeover of the reduction stage (that is, increasing or lowering the number of deactivated cylinders) are significantly reduced.

An excellent and controlled dynamic performance is obtained with a simultaneous intervention in the metering of fuel and in the ignition. This excellent and controlled dynamic performance is obtained especially for ASR operation but also in the other applications of cylinder deactivation.

The synchronization of the ignition angle change and injection suppression is advantageously undertaken when the torque change (caused by suppression and by changing the ignition angle) takes place in the opposite direction; whereas, the synchronization is unnecessary when the torque change produced by suppression and change of ignition angle takes place in the same direction.

BRIEF DESCRIPTION OF THE DRAWINGS

The invention will now be explained with reference to the drawings wherein:

FIG. 2 is an overview flowchart as an example for realizing the invention in the context of a computer program;

FIGS. 3a to 3d show the invention with respect to time-dependent curves of the injection, the ignition and the engine torque;

DESCRIPTION OF THE PREFERRED EMBODIMENTS OF THE INVENTION

Figure 1:
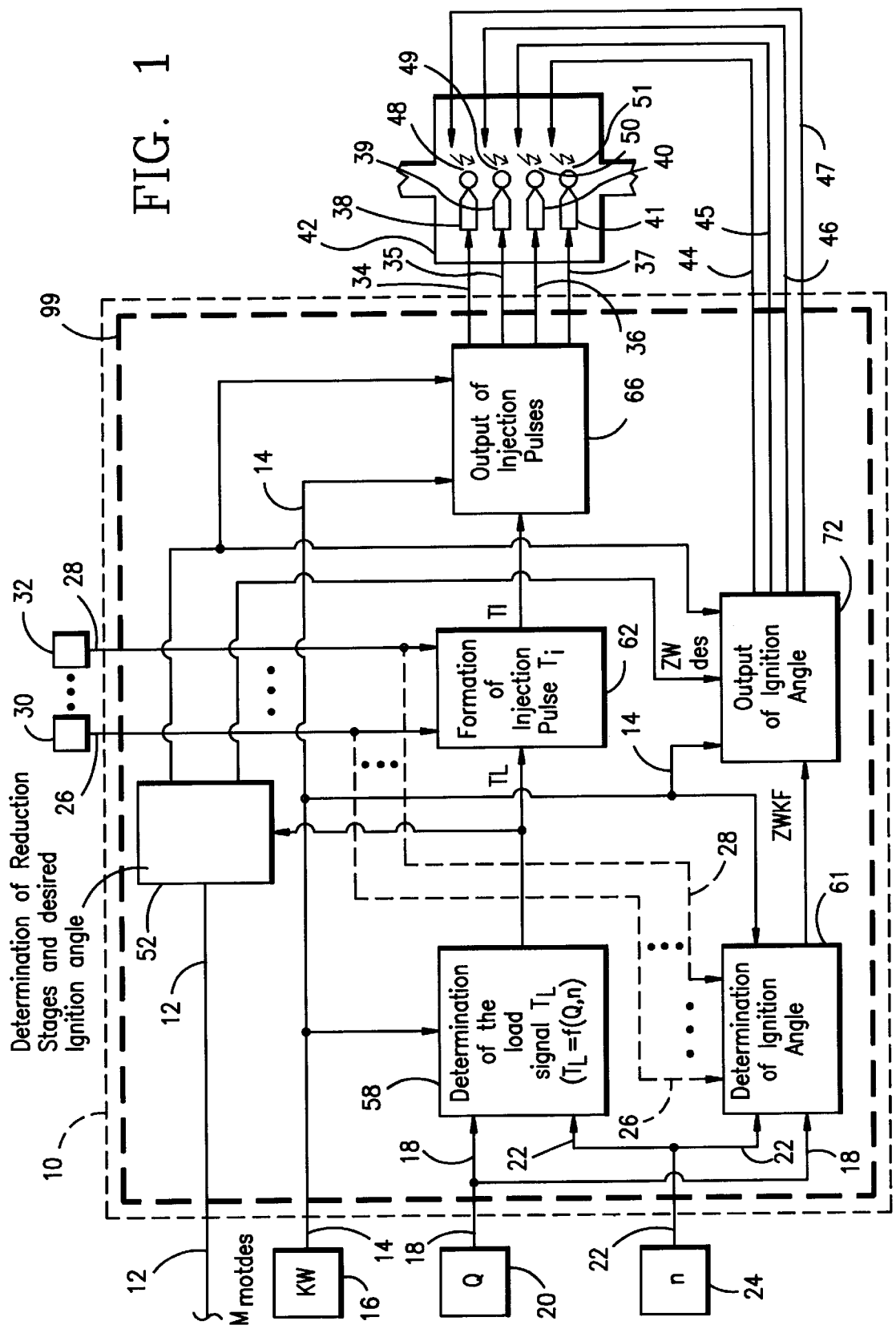
FIG. 1 shows an overview block circuit diagram of a control apparatus for an internal combustion engine having at least one microcomputer wherein the invention is applied.

A motor control apparatus 10 is shown in FIG. 1 to which, in a preferred embodiment, a torque change command Mmotdes is supplied from an ASR control system via the line 12. In addition, the control apparatus 10 is connected via an input line 14 to a measuring device 16 for detecting the crankshaft position or camshaft position. The control system is further connected via an input line 18 to a measuring device 20 for detecting the air throughput through the engine and via the line 22 to a measuring device 24 for the engine rpm. The control system is also connected via input lines 26 to 28 to measuring devices 30 to 32, respectively, for detecting additional operating variables of the engine and/or of the motor vehicle which are processed for controlling the engine. The output lines (34, 35, 36, 37) connect the engine control apparatus 10 to injection valves (38, 39, 40, 41) of a four-cylinder engine 42 in which an injection valve is provided for each cylinder. In addition, output lines (44, 45, 46 and 47) connect the control system 10 to devices (48, 49, 50 and 51) for making available the ignition spark of the engine 42.

The engine control apparatus 10 includes at least one microcomputer 99 to which input lines are connected and from which the output lines lead away. The microcomputer includes programs as shown in FIGS. 2 and 5a to 5e for carrying out the method of the invention.

Figure 5A:
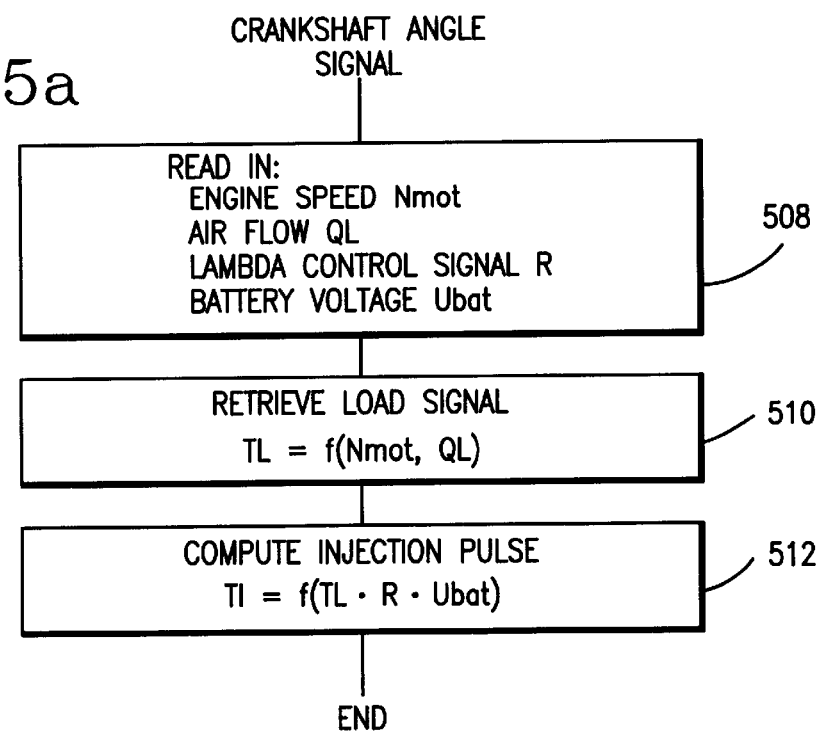
FIG. 5a is a flowchart showing the determination of the injection pulse TI for each cylinder.

A first program of the microcomputer determines the load signal TL as well as the injection pulse TI (see FIG. 5a as well as function blocks 58 and 62). In function block 58, a determination of the load signal TL is made (TL=f((Q,n)) and in function block 62, the injection pulse T1 is formed. A second program determines the ignition angle to be outputted (see function block 61 and FIG. 5b). In function block 61, a determination of the ignition angle is made. A third program determines the reduction stages and the desired ignition angle in the ASR-operation (see function block 52 and FIG. 5c). In function block 52, a determination of the reduction stages and the desired ignition angle is made. A fourth program outputs the formed input pulses (see function block 66 and FIG. 5d) and a fifth program outputs the determined ignition angles (see function block 72 and FIG. 5e). In function block 66, the injection pulses are outputted and in block 72, the ignition angle is outputted.

A correction signal for the torque Mmotdes to be outputted by the engine is transmitted to the control system 10 via the line 12 from an ASR control system. The magnitude of the correction signal is a measure of the change of the engine torque for a control of wheel slippage, that is, this magnitude represents the desired torque to be outputted by the engine in this operating state. The variable transmitted via line 12 is supplied to the microcomputer 99. In the microcomputer 99, this variable is set into relationship with the actual engine torque adjusted by the driver via the position of the throttle flap as disclosed in U.S. Pat. No. 5,558,178 incorporated herein by reference. This engine torque can be determined on the basis of the load signal TL, the engine rpm, the number of deactivated cylinders and the actual ignition angle. A deactivation pattern is determined from this relationship for realizing the desired torque while considering the actual torque (in function block 52); that is, the cylinders to be deactivated are determined. Also, the ignition angle ZWdes is determined (also in function block 52) and is necessary for making available the torque for a given deactivation stage. Different patterns can be pregiven with respect to the selection of the deactivation or reduction stages. In a preferred embodiment of a four-cylinder engine, eight reduction stages are pregiven. In a first reduction stage, every second injection in a cylinder is suppressed and in a second reduction stage, each injection pulse for this cylinder is suppressed. In the third reduction stage each injection pulse for this cylinder and every second injection pulse of a further cylinder is suppressed and so on. In this way, the engine torque can be changed in eight steps. In other embodiments, it can be advantageous to reduce the resolution of the reduction stages, for example, to four stages or to increase the resolution, for example, to twelve stages in that, in a first stage, only every third injection pulse of a cylinder is suppressed.

The injection pulse signal is determined in a known manner on the basis of the operating state of the engine, which, in turn, is determined by the measuring signal values of the air throughput of the internal combustion engine and the engine rpm which are supplied to the control apparatus 10 via the lines 18 and 22. This takes place in the microcomputer 99 wherein a load signal TL is read out on the basis of known characteristic fields in dependence upon rpm, air mass signal and/or air quantity signal or air intake pipe pressure signal (in function block 58). This load signal TL is corrected in synchronism with the crankshaft in dependence upon the operating variables supplied via lines 26 to 28, preferably on the basis of a lambda control in dependence upon the exhaust gas composition, battery voltage, et cetera and the injection pulse TI is formed. The computation operation described takes place in synchronism with the crankshaft at specific angles for each cylinder (in function block 62). The fuel is advanced in the present system; that is, the injection operation takes place in advance of the air-intake operation of the particular cylinder. This advance of fuel is then dependent upon load and rpm; that is, for example, at high rpms, the fuel for a cylinder is already injected when a previous cylinder draws in air by suction.

Information is present at the microcomputer as to how often which cylinder or cylinders are to be deactivated. The injection pulse formed for this or these cylinders is then not outputted to the corresponding injection valve. This computation takes place in synchronism with the crankshaft rotation or camshaft rotation (see FIG. 2 and FIG. 5c).

Changes of the deactivated stage, that is, when a further cylinder is deactivated or when a deactivated cylinder is again injected, lead to jump-like changes of the torque outputted by the engine.

Only a step-shaped torque change can be undertaken by injection suppression. For this reason, to improve the operation of the arrangement (especially for a change of the deactivation stage as well as for continuous adjustment of the torque in the steady-state case), an intervention in the ignition is undertaken simultaneously to injection suppression.

As known, the ignition angle or ignition time point is likewise determined in dependence upon the air throughput and the engine rpm from a characteristic field in engine control systems. This takes place in the microcomputer 99 to which the lines 18 and 22 are connected and therewith the relevant operating variables are supplied. The so-called characteristic field ignition angle ZWKF is determined. This characteristic field ignition angle ZWKF is corrected (in function block 61) in correspondence to the engine temperature and the like as required in the known engine control systems. The ignition spark for the next cylinder to be ignited is generated by driving the ignition coil in accordance with the ignition time point so determined. This operation likewise takes place in synchronism with the crankshaft (in function block 72).

In the steady-state case, for making available the pregiven torque supplementary to deactivation or reactivation and simultaneously therewith, the ignition time point is shifted in the direction of retardation (torque reduction) or is advanced (torque increase). This improves the operation of the system with injection suppression. In ASR operating state, the ignition angle ZWdes is realized in lieu of the characteristic field ignition angle ZWKF (in function block 72). By intervening in the ignition angle, a continuous torque change is obtained for an existing reduction stage in the steady-state operation so that with a common intervention the pregiven torque is adjusted continuously in the steady-state case.

With a change of the deactivation stage, characterized by a reactivation of a deactivated cylinder or by a switchoff of a cylinder which has up to now been active, the torque outputted by the engine is changed in a jump-like manner. As a rule, a torque must be adjusted which, for example, is less than the torque present for the previous reduction stage but is greater than the torque generated in the new reduction stage so that the ignition angle intervention must compensate therefor. The ignition angle is therefore likewise shifted, for example, advanced so that the torque is increased.

The following problem occurs in combination with the above-described advance of the fuel. For example, when the above-described increase of the deactivation stage takes place, that is, a further reduction of engine torque, the commands for the deactivation of a further cylinder as well as for the change of the ignition angle shift are present simultaneously, the cylinder deactivation can take place only at least two ignitions later as a consequence of the delay by advance of fuel and the induction or compression phase of the cylinders in a four-cylinder engine. An overshoot of the engine torque takes place because, in the meantime, the engine torque was increased by advancing the ignition angle. This affects the driving performance. The advance of fuel is dependent upon load and rpm and not every cylinder is deactivated which is the next cylinder to be injected because of the fixed deactivation pattern. For this reason, this overshoot of the torque can be very large and lead to accelerations over the short term. A corresponding performance occurs for the reduction of the deactivation stage. That is, switching in a deactivated cylinder and the shift of the ignition angle in the direction of retardation can cause an uncontrolled undershoot of torque to occur.

According to the procedure of the invention, the cylinder deactivation and the ignition angle shift are synchronized so that the ignition angle shift only takes place when the corresponding cylinder is deactivated for the first time or a deactivated cylinder is again activated for the first time (in function block 72). The procedure is followed that, always when a cylinder is changed for the first time with respect to its activity (from activation into deactivation or from deactivation into activation), the ignition angle corresponding thereto is changed starting with this cylinder. In contrast, no such synchronization is necessary when the deactivation stage remains unchanged. The ignition angle can then be changed at any time. With synchronization, only small controlled undershoots or overshoots take place in the dynamic case. By means of synchronization, it is further achieved that the remaining undershoots or overshoots go in the same direction as the desired torque change because the change of the reduction stage dominates the ignition angle intervention. A synchronization is also not necessary when both interventions (change of the deactivation stage, shift of ignition angle) for torque change go in the same direction. This is, for example, the case when a larger deactivation stage and an ignition angle displacement toward retardation is desired because of a torque reduction command of the ASR system. The two interventions do not have to be synchronized and the ignition angle intervention can begin immediately (see FIGS. 2 and 5e).

FIG. 2 shows a flowchart for illustrating the procedure of the invention in the context of a computer program of a microprocessor which is shown in FIG. 1. After start of the subprogram shown in FIG. 2, the command for torque change from an ASR system is read in in a first step 100. This command is supplied via the line 12 or a corresponding bus system. In the ASR system, the command represents a desired value for the torque to be outputted by the engine or a desired value for the engine load to be adjusted. Thereafter, in step 102, the cylinders to be deactivated are determined in dependence upon this desired value and the actual value (for the engine torque or engine load) adjusted by the driver; that is, the reduction stage or deactivation stage and simultaneously the ignition angle desired value ZWdes are determined. This takes place in a preferred embodiment in that a pregiven deactivation stage is read out of a table in dependence upon the difference between desired value and actual value. This deactivation stage lies next to the pregiven torque change and an ignition angle desired value is determined from a table which compensates for the remaining difference. Ignition angle intervention and injection suppression for changing torque can take place in the same or in opposite directions. The ignition angle intervention is further limited by the knock limits. Another strategy with advantageous effects for determining the injection intervention and the ignition intervention comprises that the available torque difference is always overcompensated by the injection intervention; that is, for a torque increase, a deactivation stage is outputted for which a larger torque is emitted and for a torque reduction, a deactivation stage is emitted wherein the engine outputs a lower torque. The difference is then compensated by the shift of ignition angle. The effects of injection intervention and ignition intervention are always opposite. If the ignition angle intervention cannot provide the pregiven torque completely, then the torque change is always on the correct side; that is, for reduction, the outputted torque is somewhat less than pregiven and for increasing somewhat higher. If no command is present, then the desired value is set to a value which cannot be reached in normal operation so that all cylinders are always fired and the ignition angle is determined in accordance with the corrected characteristic field ignition angles as may be required.

The determined deactivation stage is outputted according to step 104 and, for the injection, is preferably realized by means of logical coupling (for example, as logic AND-coupling so that the injection pulse (which is determined in dependence upon the load signal) is passed when the deactivation stage contains a one; that is, the corresponding cylinder is to be activated and, in contrast, the injection pulse is not passed when the deactivation stage contains a zero for the corresponding cylinder). In this way, fuel is injected for one cylinder, but not for that cylinder which is to be deactivated. This can, as a consequence of the advance of the fuel, be at the earliest a cylinder which draws in fuel, for example, two ignitions later than the time point for the output of the deactivation stage.

Inquiry step 106 follows step 104 and a check is made in step 106 as to whether a deactivation stage change has taken place; that is, whether a cylinder which has been activated up to now has been deactivated or a cylinder which was deactivated up to now is now being activated. If this is not the case, then in accordance with step 108, the determined ignition angle desired value ZWdes is outputted immediately for the next cylinder to be ignited. If a deactivation stage change has taken place, then, according to step 110, that cylinder is identified on the basis of the new deactivation stage which will be the next cylinder to be changed with respect to its activity, that is, from a fired or active state to a deactivated state or from a deactivated state into an active state. Thereupon and in accordance with steps 112 and 112b, the output of the newly determined ignition angle desired value is delayed until the cylinder identified in step 110 is ignited. Starting with this cylinder and the next cylinders, the new ignition angle desired value is outputted and until up to this identified cylinder, work is still done with the previous "old" ignition angle desired value (step 112c). After the steps 112 or 108, the subprogram is ended and repeated at a pregiven time. In other embodiments, the ignition angle change can be carried out only for all cylinders ignited after the identified cylinder; whereas, for the identified cylinder, the previous desired value is still used.

In addition, in an advantageous embodiment, a synchronization of ignition intervention and deactivation is provided when both interventions change the torque in the same direction. This means that between steps 106 and 110, an inquiry is inserted which ascertains whether an ignition angle change and deactivation stage change has as a consequence a torque change in the same direction. If this is the case, step 108 is carried out and if this is not the case, then step 110 is carried out.

This described procedure is explained in FIGS. 3a to 3d, 4a and 4b. FIG. 3a shows, for example, the number of the inducting cylinders as a function of time; whereas, in FIG. 3b, reduction stages are shown. Here, 1 means that the particular cylinder thereabove is fired (activated) and the 0 means that the cylinder thereabove is deactivated.

FIG. 3c shows the time-dependent course of the ignition angle desired value ZWdes; whereas, FIG. 3d shows the time-dependent course of the transmitted torque desired value.

The following situation is presumed: the vehicle is accelerated with the wheel slippage increasing above its limit value so that a torque reduction is pregiven to the value M2 shown as exemplary in FIG. 3d. This input value was converted by the microprocessor into a reduction stage 1 in which the cylinder 2 is deactivated as well as into a desired ignition angle ZWdesl (see FIG. 3c). Injection pulses are emitted to the cylinders 1, 3 and 4 in accordance with the sequence of the cylinders; whereas, the injection pulse for the cylinder 2 is suppressed. Time point T1 lies within the first camshaft revolution described above. At this time point, the slippage of the drive wheel is increased because of a location of low friction so that a further reduction of the engine torque to a value M1 is desired. At time point T1, the microprocessor then computes this torque command into a reduction stage 2 and assigns an ignition angle desired value ZWdes2 to this torque command in order to realize the desired engine torque M1. The torque-reducing change of the reduction stage and the torque-increasing change of the ignition angle act toward each other with the sum defining the engine torque M1. For the reasons advanced above, the realization of the ignition angle desired value ZWdes2 is delayed. This ignition angle desired value ZWdes2 could have been realized at time point T1 to the cylinder 3 during the first revolution. This is the case because the newly determined reduction stage 2 (during which the cylinder 4 is deactivated) only becomes effective with the next revolution because of the advance of the fuel. For this reason, the ignition angle change at time point T1 would lead to an unwanted torque increase. The ignition angle change takes place only at time point T3 in accordance with the procedure of the invention when the newly deactivated cylinder 4, that is, the cylinder which has changed its activity, should have been ignited. At this time point, the ignition angle desired value is emitted to the value ZWdes2 which corresponds to the reduction stage 2 for the realization of the torque M1 and is maintained for the next revolution. At time point T2, a torque increase to the value M3 is necessary for slippage control as a consequence of the torque reduction or as a consequence of another characteristic of the road. A corresponding input value is supplied by the ASR system. Thereafter, the microprocessor computes the reduction stage, which is suitable for realizing the torque M3, as well as a desired ignition angle ZWdes3. As with the torque reduction, this desired ignition angle could already be realized at time point T2. The ignition angle change is delayed since, as a consequence of the fact that fuel injection precedes the air intake operation, the cylinder 4 remains deactivated after time point T2 and is only resumed with the next revolution. An ignition angle change at time point T2 would have caused an unwanted torque reduction at time point T2 which is to be avoided. An ignition angle change from the value ZWdes2 to the value ZWdes3 accordingly takes place only at time point T4, that is, when the cylinder 4, which changes its activity, should be ignited. After the end of the ASR intervention, the input value is set to a value which is greater than all torques inputted by the driver. All cylinders are fired and the ignition angle is returned to the characteristic field ignition angle.

Figure 4A:
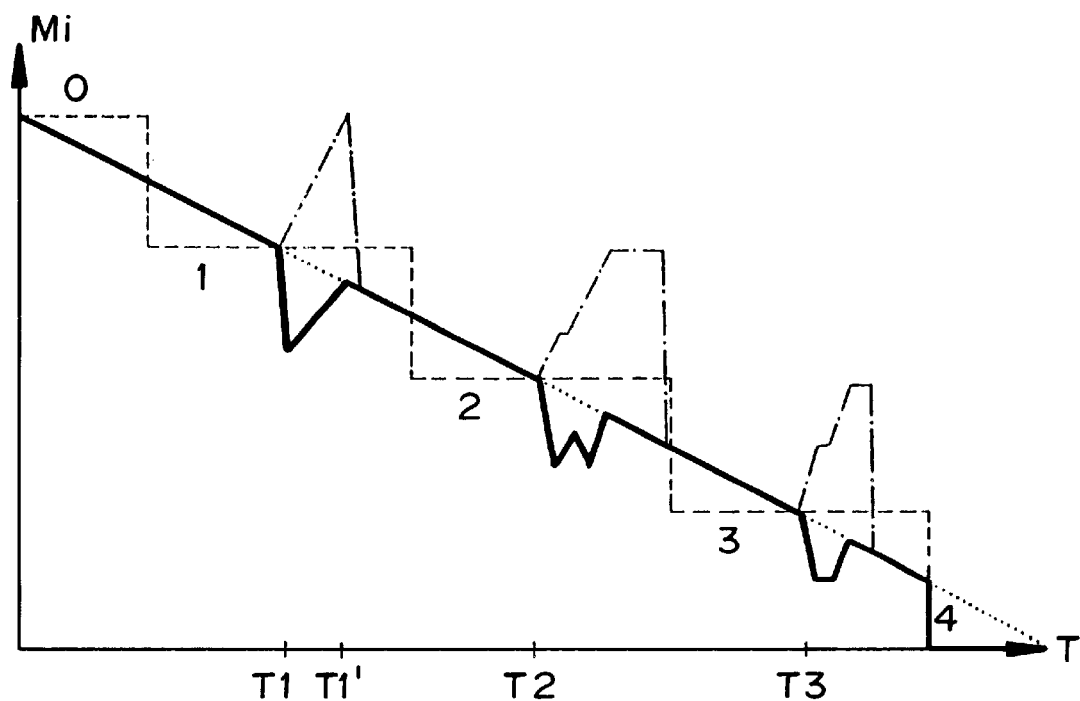
FIGS. 4a and 4b show the required torque as a function of time.
Figure 4B:
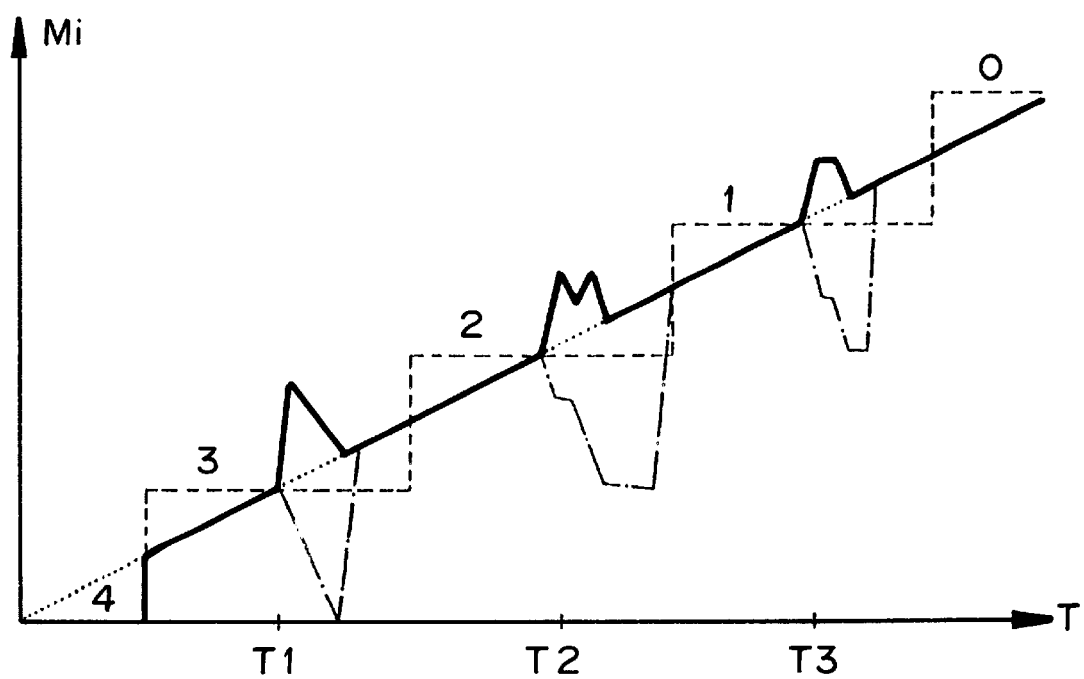

In FIGS. 4a and 4b, a different presentation of the operation of the procedure of the invention is selected. FIG. 4a shows the time-dependent course of the required engine torque Mi; that is, the engine torque generated by the combustion without torque loss for a continuous change of the reduction stage in a torque-reducing manner; whereas, in FIG. 4b, the required engine torque is shown with a continuous change of the reduction stage in the direction of increasing torque. The broken line represents the course of the torque for an exclusive injection intervention and the solid line represents the course of the torque in accordance with the procedure of the invention; whereas, the dot-dash line represents the course of the torque for a non-synchronized ignition and injection intervention. The torque input of the ASR system leads to a torque reduction as shown in FIG. 4a. This torque reduction is realized by a sequence of different reduction stages. For an intervention which is exclusively with respect to injection, this leads to a stepped course of the torque. The required engine torque is continuously shifted in accordance with the pregiven straight lines when there are simultaneous injection and ignition interventions without synchronization. The ignition angle intervention is adequate up to time point T1, then a reduction stage change is made and the ignition angle is advanced in parallel therewith in the sense of increasing torque. This leads to the torque increase starting at time point T1 shown by the dash-dot line and therefore leads to an unwanted operating behavior. Corresponding disadvantages occur at time points T2 and T3. According to the procedure of the invention (solid line) according to which a synchronized intervention with respect to injection and ignition angle takes place, the previous ignition angle is maintained with the change of the reduction stage from time point T1 so that a torque reduction occurs. The ignition angle then is advanced when the cylinder, which changes its activity, is intended to be ignited. This leads to a slight increase in torque until the pregiven torque is reached at time point T1'. It is shown that a significantly smaller jump in torque results which furthermore leads in the correct direction. The procedure of the invention shows a corresponding effect at time point T2 and T3.

The course of the torque occurs in the same manner for an increase of engine torque (FIG. 4b). In this case, the procedure of the invention (solid line) leads to the desired torque increase starting at the time points T1, T2 and T3; whereas, for a non-synchronized intervention, a torque change (dash-dot line) occurs which is opposite to the input direction. In addition to the embodiment shown in combination with an ASR system, the procedure provided by the invention is applicable anywhere where the engine power is adjusted by deactivating individual cylinders, for example, when a power to be outputted is to be adjusted by the driver via the position of the accelerator pedal and this power is adjusted at a preset air setting by switching in deactivated cylinders when the power increases. The application of the procedure presented by the invention also leads to the above-mentioned advantages for these control systems.

The flowcharts of FIGS. 5a to 5e disclose a preferred embodiment of the method of the invention and will now be described.

The program of FIG. 5a is for determining the injection pulse TI and is initiated in synchronism with the revolution (rotational angle) of the crankshaft or camshaft. The program is run through for each of the cylinders to compute the injection pulse therefor. In the first step 508, the following are read in: engine rpm Nmot, a measurement signal value for the air throughput Q1 as well as correction values such as the output signal R of a lambda controller and/or the battery voltage Ubat. In the next step 510, a load signal TL is read out on the basis of a characteristic field dependent upon engine rpm and air throughput signal. The load signal TL is used in the following step 512 and is corrected by multiplication by the lambda controller signal R and the battery voltage. The corrected load signal is then the injection time TI. Thereafter, the program is ended and is repeated for the next cylinder at an appropriate signal.

Figure 5B:
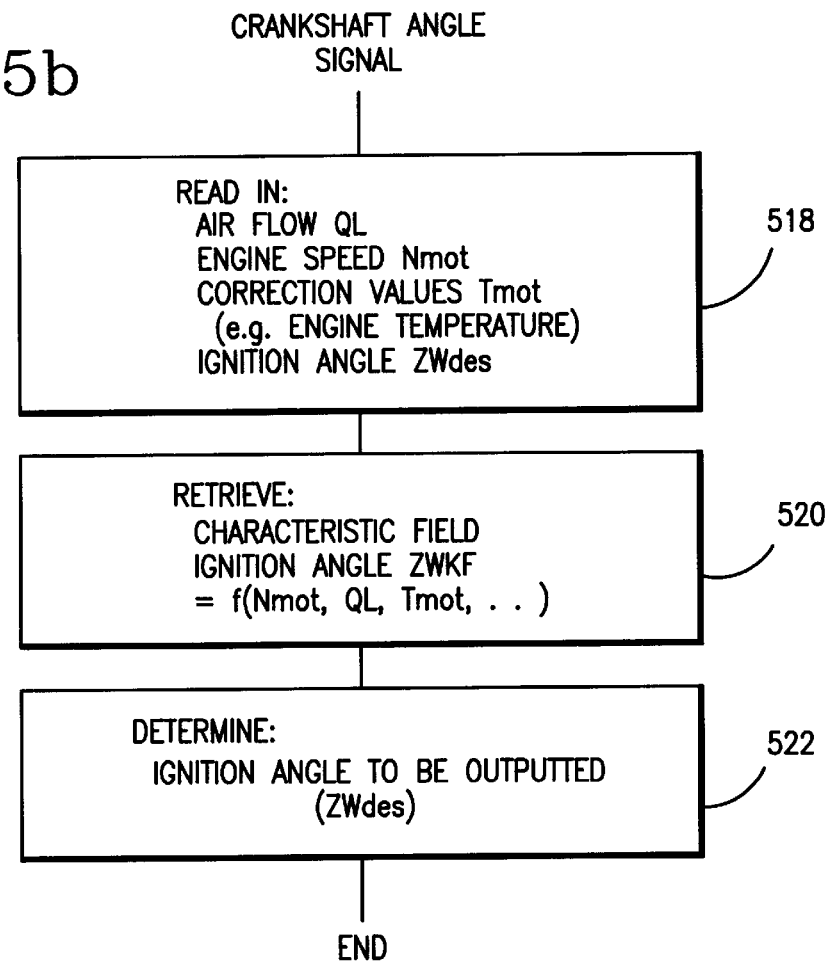
FIG. 5b is a flowchart showing the determination of the ignition angle to be adjusted.

The ignition angle to be outputted is determined in the program shown in FIG. 5b. This program too is started in synchronism with the crankshaft. In the first step 518, the following operating variables are read in: air throughput, engine rpm, correcting variables such as the engine temperature Tmot and, if required, the desired ignition angle ZWdes, which is to be adjusted. The desired ignition angle Zwdes is determined as described below.

In step 520, the so-called characteristic field ignition angle ZWKF is read out from an air throughput/rpm characteristic field and corrected as required. In the following step 522, the ignition angle ZWdes, which is to be outputted, is determined from the characteristic field ignition angle ZWKF or the desired ignition angle ZWdes. The desired ignition angle is outputted when it differs from the characteristic field angle. Thereafter, the program is ended and is repeated for the next cylinder when there is an appropriate signal.

Figure 5C:
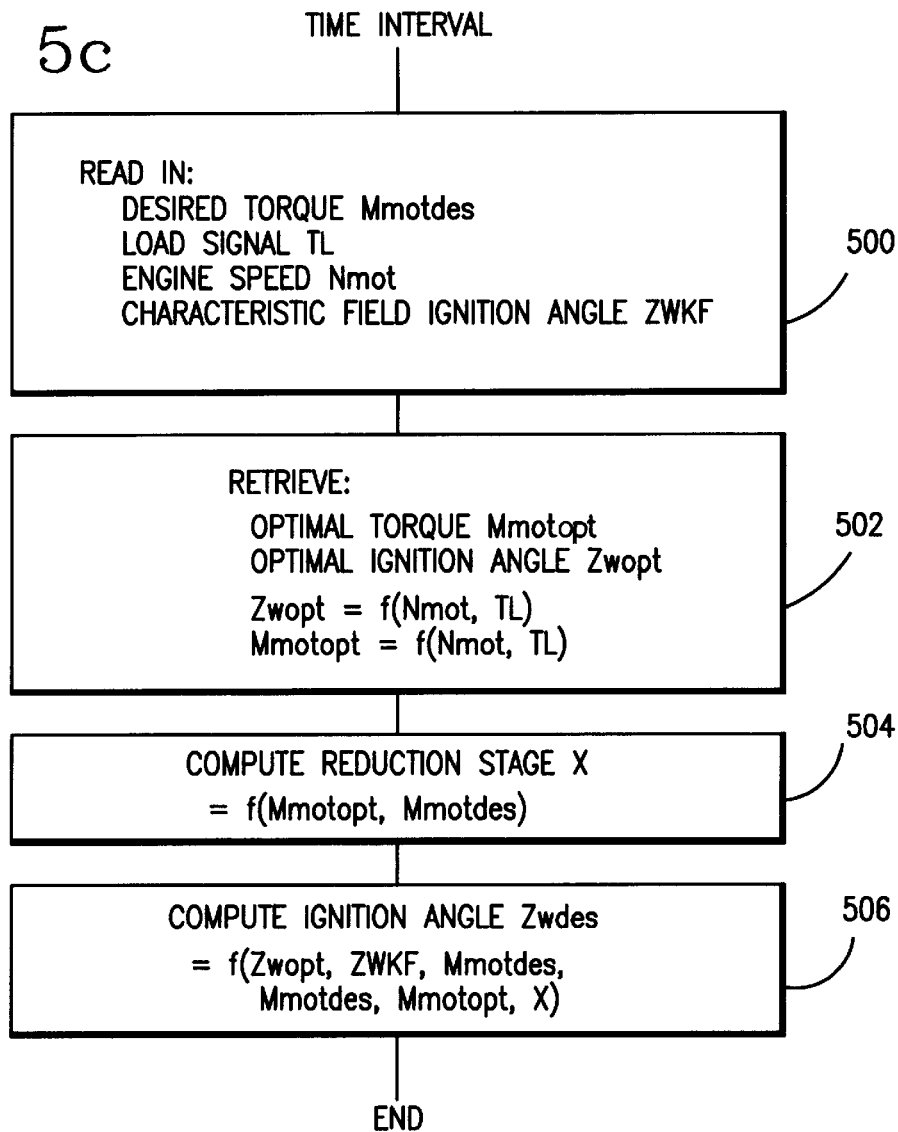
FIG. 5c is a flowchart showing the determination of the cylinder suppression and the ignition angle adjustment for adjusting torque in accordance with the state of the art discussed above as part of the background of the invention.

The program shown in FIG. 5c is started at pregiven time intervals, for example, 10 msec. The described procedure is disclosed in U.S. Pat. 5,558,178, which is incorporated herein by reference.

The variables to be evaluated are read in in the first step 500. These variables are: the desired torque Mmotdes, motor load TL, engine rpm Nmot and the characteristic field ignition angle ZWKF. In the next step 502, an actual torque of the engine is computed on the basis of the actual engine setting (TL, Nmot). In this context, a value for the torque dependent upon load TL and engine rpm Nmot is first read out of a characteristic field. This characteristic field defines the torque Mmotopt referred to an ignition angle ZWopt, which is optimal with respect to power output or torque output. The ignition angle ZWopt is likewise determined from a load/rpm characteristic field.

Thereafter, in step 504, the reduction stage (that is, the number X of the cylinders to be deactivated) is determined for a maximum permissible ignition angle correction dZWmax of the characteristic field ignition angle ZWKF in accordance with the equation:

$$X=Z*(\text{Mmotopt}*F(\text{dZWmax})-\text{Mmotdes})/(\text{Mmotopt}*F(\text{dZWmax}))$$

wherein: Z=the total number of cylinders; and, F(dZWmrax)= the torque change determined from a characteristic line at a maximum ignition angle shift.

The determined value X contains the data as to which cylinder and how often said cylinder is to be deactivated.

In the next step 506, the ignition angle, which is required for the precise setting of the desired torque, is determined while considering the number of cylinders to be deactivated in accordance with the equation:

$$\text{ZWdes}=\text{ZWopt}-\text{dZW}=\text{ZWopt}-F(\text{Mmotdes}/(\text{Mmotopt}*(1-X/Z)).$$

Thereafter, the program is ended and repeated at a given time.

Figure 5D:
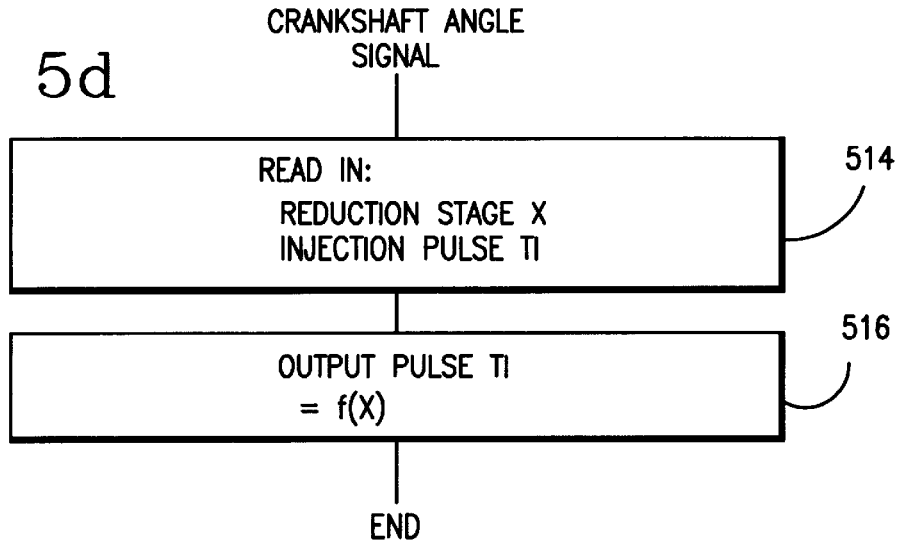
FIG. 5d is a flowchart for outputting the injection pulse TI.

The output of the computed injection pulse TI is shown in the program of FIG. 5d. This program then likewise runs synchronously with the rotation (angle of rotation) of the crankshaft. In the first step 514, the reduction stage X and the pulse width of pulse TI are read in. The pulse width of pulse TI is determined for the injection operation which follows in accordance with the crankshaft signal. In the next step 516, the pulse is outputted if the corresponding cylinder is not to be deactivated in accordance with the read-in reduction stage. Otherwise, this output is not needed and no fuel is injected.

Figure 5E:
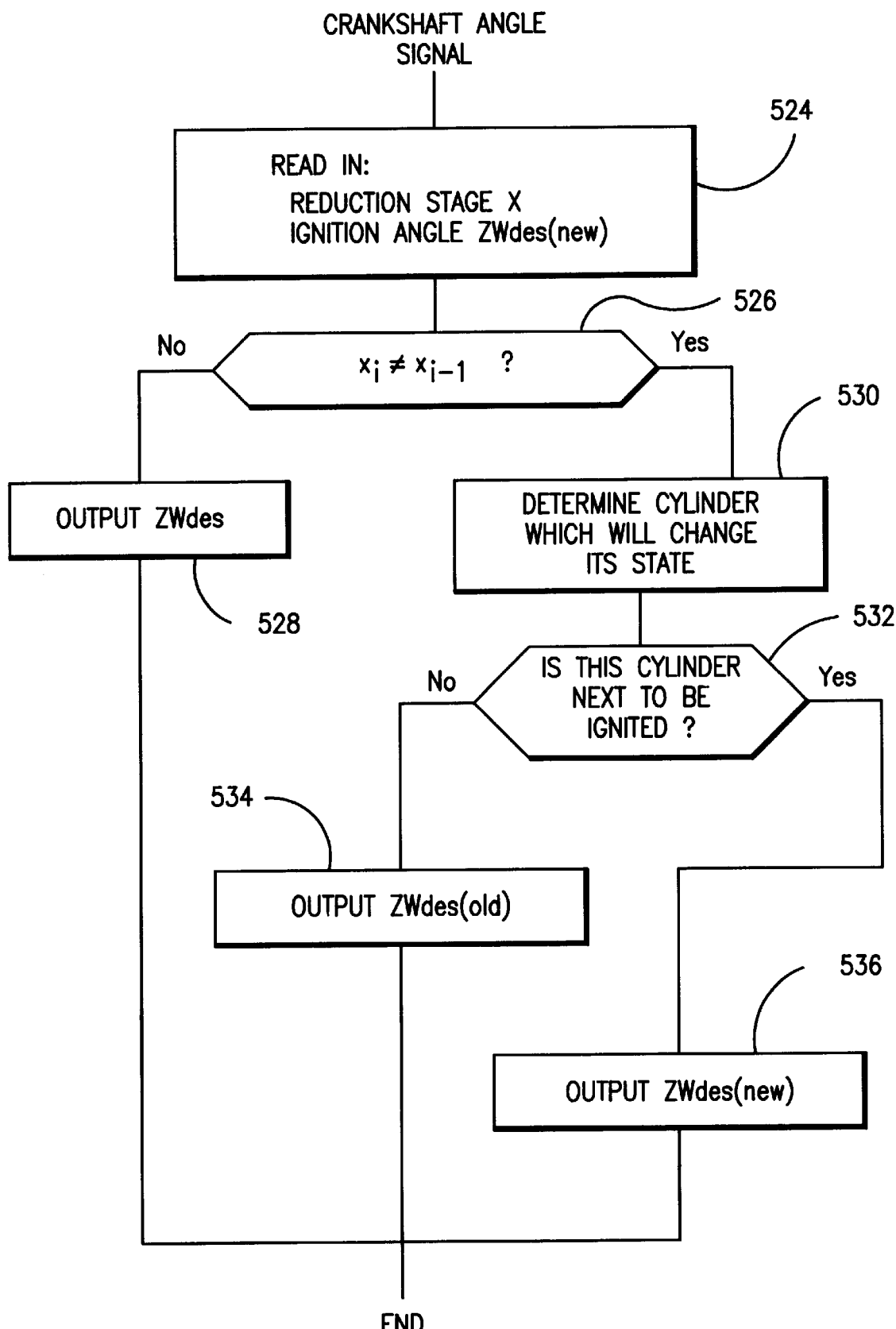
FIG. 5e is a flowchart for outputting the ignition angle to be adjusted.

The synchronization according to the invention between injection intervention and ignition angle intervention is shown in the program of FIG. 5e. This program too is started in synchronism with the crankshaft. In the first step 524, the actual values which are present for the reduction stage X and for the computed ignition angle ZWdes, which is to be adjusted, are read in.

In the next step 526, a comparison is made of the actual reduction stage and the reduction stage which is determined in advance of a crankshaft angle and which corresponds to an operating cycle of the engine (720° for a four stroke engine). With this comparison, a determination is made as to whether a change of the reduction stage has taken place within this operating cycle. If this is not the case, the read-in ignition angle ZWdes is immediately outputted according to step 528. This outputted ignition angle ZWdes becomes effective with the next igniting cylinder and the torque of the engine is correspondingly adjusted. If a change of the reduction stage is determined in step 526, the cylinder is determined in step 530 which changes its state from injection to deactivation or vice versa. This determination is made on the basis of a comparison of the new and the old reduction stage of the cylinder. This change of state from injection to deactivation or vice versa takes place with a comparison of the corresponding table entries.

The program runthrough is started in dependence upon the crankshaft signal and is therefore started for a specific cylinder. In the next step 532, a check is made as to whether the outputted ignition angle adjustment becomes effective for this cylinder in the actual program runthrough. If this is not the case, then, according to step 534, the previous (old) ignition angle ZWdes is outputted which had been computed before a change of the reduction stage. The program is ended after steps 528, 534 or 536 and is again initiated for a corresponding crankshaft angle for the next cylinder.

The procedure of the invention is applied advantageously to internal combustion engine having any desired number of cylinders.

In addition to the shown input of a torque desired value, the input in other embodiments of an rpm desired value, a power desired value, a load desired value and the like is advantageous which, with the aid of the procedure of the invention is adjusted by deactivation and reactivation of individual cylinders and synchronized ignition intervention.

It is understood that the foregoing description is that of the preferred embodiments of the invention and that various changes and modifications may be made thereto without departing from the spirit and scope of the invention as defined in the appended claims.

What is claimed is:

1. Method for controlling the torque of an internal combustion engine while deactivating a single cylinder, the method including adjusting the ignition angle and adjusting the metering of fuel to the cylinder, the engine having cylinders which assume a first state in which fuel is supplied thereto and a second state in which no fuel is supplied thereto, the method comprising the steps of:

reading a pregiven desired value of torque (Mmotdes) for the torque of said engine;

determining a number (X) of cylinders which assume said second state and determining an adjustment of said ignition angle (ZWdes) dependent upon said pregiven desired value of torque (Mmotdes);

outputting injection pulses in dependence upon the determined number (X) of said cylinders which assume said second state;

determining whether at least one cylinder changes its state relative to a previous operating cycle;

outputting an ignition angle on the basis of the determined ignition angle (ZWdes) for any one of said cylinders when no cylinder changes its state; and, outputting an ignition angle on the basis of the determined ignition angle (ZWdes) only for the at least one cylinder which changes its state when at least one cylinder changes its state compared to a previous operating cycle.

2. The method of claim 1, further comprising adjusting said desired engine torque (Mmotdes) by suppressing the injection of fuel and by determining deactivation stages and by simultaneously shifting the ignition angle; and, for steady-state operation, adjusting said engine torque continuously by simultaneously acting on said ignition angle.

3. The method of claim 1, further comprising shifting said ignition angle for the next cylinder which changes its state from deactivation to activation or vice versa.

4. The method of claim 1, further comprising synchronizing injection intervention and ignition angle intervention only when a change in torque by injection intervention is countered by a change in torque by ignition angle intervention.

5. The method of claim 4, further comprising synchronizing said interventions when the reduction stage changes.

6. The method of claim 5, further comprising immediately shifting the ignition angle for the next cylinder when the reduction stage is not changing, or when said ignition angle intervention and said injection intervention effect respective torque changes which operate in the same direction.

7. The method of claim 1, further comprising adjusting said desired engine torque (Mmotdes) by making a common determination of the reduction stage and desired ignition angle while taking into account a value representing a torque actual value.

8. The method of claim 1, wherein the reduction stages are fixedly pregiven and the method further comprising adjusting the engine torque continuously within a reduction stage by adjusting the ignition angle.

9. The method of claim 1, further comprising generating said desired engine torque (Mmotdes) in the sense of a control of the slippage of the drive wheels, an rpm limit or in dependence upon a load input from a drivers to a pregiven value.

10. An arrangement for controlling the torque of an internal combustion engine while deactivating a single cylinder, the engine having cylinders which assume a first state in which fuel is supplied thereto and a second state in which no fuel is supplied thereto, said engine further having a desired ignition angle (ZWdes) and receiving fuel metered thereto, the arrangement comprising:

a control apparatus including at least one microcomputer;

first means for reading a desired value of torque (Mmotdes) of said engine into said microcomputer;

second means for reading an air quantity (Q) representing the air supplied to said engine into said microcomputer;

third means for reading a rpm quantity (n) representing the rpm of said engine into said microcomputer; and, said microcomputer being programmed to function to:

(a) determine a number (X) of said cylinders which assume said second state and to determine an adjustment of said desired ignition angle (ZWdes) in dependence upon said desired value of torque (Mmotdes);

(b) determine a signal (TL), which represents the load on said engine, in dependence upon said air quantity (Q) and said rpm quantity (n);

(c) determine an ignition pulse (Ti) at least in dependence upon said load signal (TL);

(d) output said injection pulse (Ti) in dependence on said number (X) of said cylinders which assume said second state;

(e) output an ignition angle on the basis of said desired ignition angle (ZWdes) determined in dependence upon said desired value of torque (Mmotdes) of said engine when no cylinder changes its state with respect to a previous operating cycle; and, (f) output an ignition angle on the basis of said desired ignition angle (ZWdes) determined from the desired value of torque (Mmotdes) only for the at least one cylinder which changes its state when at least one cylinder changes its state compared to a previous operating cycle.

* * * * *

UNITED STATES PATENT AND TRADEMARK OFFICE
CERTIFICATE OF CORRECTION

PATENT NO. : 5,769,054
DATED : June 23, 1998
INVENTOR(S) : Eberhard Schnaibel and Hong Zhang

It is certified that error appears in the above-identified patent and that said Letters Patent is hereby corrected as shown below:

Title page item [54], and column 1, line 2, after "OF", insert -- AN --.

In column 3, line 35: delete "(TL=f((Q,n))" and substitute -- (TL=f(Q,n)) -- therefor.

In column 3, line 36: delete "T1" and substitute -- Ti -- therefor.

In column 6, line 53: after "angles" insert -- , --.

In column 7, line 13: delete "112" and substitute -- 112a -- therefor.

In column 8, line 40: delete "Mi;" and substitute -- Mi, -- therefor.

In column 8, line 66: after "line)" insert -- , --.

In column 10, line 22: delete "F(dZWmrax)" and substitute -- F(dZWmax) -- therefor.

UNITED STATES PATENT AND TRADEMARK OFFICE
CERTIFICATE OF CORRECTION

PATENT NO. : 5,769,054
DATED : June 23, 1998
INVENTOR(S) : Eberhard Schnaibel and Hong Zhang It is certified that error appears in the above-identified patent and that said Letters Patent is hereby corrected as shown below:

In column 11, line 14: between "to" and "internal" insert -- an --.

In column 11, line 20: between "invention" and "is" insert -- , --.

In column 11, line 35: between "reading" and " a " insert -- in --.

In column 12, line 23: delete "drivers" and substitute -- driver -- therefor.

Signed and Sealed this

Fourteenth Day of September, 1999

Attest:

Q. TODD DICKINSON

*Attesting Officer*  *Acting Commissioner of Patents and Trademarks*